United States Patent [19]

Doesburg et al.

[11] Patent Number: 5,159,012
[45] Date of Patent: Oct. 27, 1992

[54] PROCESS FOR THE MANUFACTURE OF POLYURETHANE ELASTOMERS

[75] Inventors: Van I. Doesburg, Dalton, Ga.; Mark N. Cline, Harrison, Tenn.; Byoung-In Cho, Cohutta; L. Jay Taylor, Cartersville, both of Ga.

[73] Assignee: Textile Rubber & Chemical Co., Inc., Dalton, Ga.

[21] Appl. No.: 800,406

[22] Filed: Nov. 29, 1991

[51] Int. Cl.$^5$ ............................................. C08L 75/04
[52] U.S. Cl. ................................ 524/779; 524/780; 524/786; 524/788; 528/55
[58] Field of Search ............... 524/779, 780, 786, 788; 528/55

[56] References Cited

U.S. PATENT DOCUMENTS

| | | | |
|---|---|---|---|
| 3,664,863 | 5/1972 | Dijkhuizen et al. | 156/306 |
| 3,705,834 | 12/1972 | Terry | 252/426 |
| 3,816,339 | 6/1974 | Raden | 252/426 |
| 4,041,019 | 8/1977 | McGraw et al. | 548/301 |
| 4,097,424 | 6/1978 | Blount | 528/60 |
| 4,153,777 | 5/1979 | Slagel | 528/60 |
| 4,184,031 | 1/1980 | Graham et al. | 528/55 |
| 4,293,679 | 10/1981 | Cogliano | 528/48 |
| 4,699,968 | 10/1987 | Kay et al. | 528/61 |

Primary Examiner—Maurice J. Welsh
Attorney, Agent, or Firm—Jones, Askew & Lunsford

[57] ABSTRACT

An improved process for the manufacture of polyurethane elastomers from a reaction mixture which comprises a polyol, an isocyanate, water, a bismuth catalyst and an optional filler. In the improved process of this invention, the rate of reaction is decreased by the addition of water to the reaction mixture and increased by the removal of water from the reaction mixture.

19 Claims, No Drawings

PROCESS FOR THE MANUFACTURE OF POLYURETHANE ELASTOMERS

FIELD OF INVENTION

The present invention relates to an improved process for the manufacture of polyurethane elastomers. In accordance with this invention, water is added to or removed from the process to decrease or increase the rate of reaction, respectively.

BACKGROUND OF THE INVENTION

Polyurethane elastomers are well-known for use in applications where durability is an essential characteristic. For example, these elastomers are well-known for use in molded products and as the material for shoe soles. These polyurethane elastomers are also advantageous for use as backing materials in commercial carpet tiles, as these elastomers provide the necessary durability for heavy traffic use over an extended period of time; for example, see Terry U.S. Pat. No. 3,705,834. Accordingly, much research and development have been dedicated to the manufacture of polyurethane elastomers in order to insure such durability on a consistent basis.

Many processes are known for the manufacture of polyurethane elastomers, an example of which involves the reaction of an isocyanate and a polyol in the presence of water and a catalyst. Various metal salts, such as bismuth salts, are known catalysts for these reactions. In some instances, the initiation of catalytic activity must be delayed and the polymerization reaction rate must be adjusted in order to obtain the desired processing and complete curing of the elastomer. Once initiated, however, the polymerization reaction should be rapid and sustainable in order to complete the manufacture of the polyurethane elastomers.

These parameters and requirements for the polymerization reaction are difficult to achieve with the current processes and, therefore, such processes may result in premature initiation of the catalytic activity and/or incomplete curing of the elastomer.

Therefore, a need exists for a process for the manufacture of polyurethane elastomers in which the rate of reaction can be adjusted in order to obtain the desired results.

SUMMARY OF THE INVENTION

The existing need as described above is met by the present invention which provides an improved process for the manufacture of polyurethane elastomers which are useful as backing materials for commercial carpet tiles, in molded products, etc. In accordance with this invention, polyurethane elastomers are manufactured by the reaction of a mixture of a polyol and an isocyanate in the presence of water and a bismuth catalyst.

More specifically, this invention provides an improved process for the manufacture of polyurethane elastomers wherein the initiation of catalytic activity and the rate of reaction can be (1) slowed by the addition of water to the reaction mixture or (2) accelerated by the removal of water from the reaction mixture.

Accordingly, an object of this invention is to provide polyurethane elastomers.

Another object of this invention is to provide polyurethane elastomers which are useful as backing materials for commercial carpet tiles, in molded products, as the material for shoe soles, etc.

Another object of this invention is to provide an improved process for the manufacture of such polyurethane elastomers.

Still another object of this invention is to provide such improved process which involves the reaction of a mixture of a polyol and an isocyanate in the presence of water and a bismuth catalyst.

Still another object of this invention is to provide such improved process which involves the reaction of a mixture of a polyol and an isocyanate in the presence of water, a bismuth catalyst and a filler.

A still further object of this invention is to provide such improved process wherein the catalytic activity of the bismuth catalyst and the rate of reaction are slowed by the addition of water to the reaction mixture.

A still further object of this invention is to provide such improved process wherein the catalytic activity of the bismuth catalyst and the rate of reaction are accelerated by the removal of water from the reaction mixture.

A still further object of this invention is to provide an improved process for the manufacture of polyurethane elastomers wherein such process does not produce undesirable foaming of the elastomers.

These and other objects, feature and advantages of this invention will become apparent from the following detailed description and claims.

DETAILED DESCRIPTION OF THE INVENTION

In accordance with the present invention, polyurethane elastomers are manufactured by an improved process in which a polyol component and an isocyanate component are mixed and reacted, wherein the improvement comprises adjusting the rate of reaction by the addition of water to, or removal of water from, the reaction mixture. In the preferred embodiment of this invention, water is added to or removed from the polyol component of the reaction mixture.

With regard to the manufacture of polyurethane elastomers, the industry has developed a terminology by which the isocyanate and polyol components are referred to as the "A Side" and "B Side," respectively, of the reaction mixture. In further accord with this industry, the term A Side (also referred to as the isocyanate component) refers to the isocyanate(s) used in the reaction mixture, whereas the term B Side (also referred to as the polyol component) refers to the poloyl(s) and any other materials used in the reaction mixture. Examples of suitable isocyanates, polyols and other materials are discussed below.

In this invention, we have discovered that the removal of water from the polyol component will increase or accelerate the catalytic activity of the bismuth catalyst and, therefore, the rate of polymerization will also increase or accelerate. On the other hand, we have discovered that the addition of water to the polyol component will have an opposite effect; that is, the catalytic activity of the bismuth catalyst will slow or decrease and, therefore, the rate of polymerization will slow or decrease. Thus, the water content of the reaction mixture can be used to adjust the rate of reaction to accommodate various processes for the manufacture of polyurethane elastomers.

In accordance with this invention, the total water content of the reaction mixture should be within the range of 0 to about 0.35%, based on the weight of the polyol component. In further accordance with this invention, the amount of water required to adjust the rate of reaction is relatively small, that is, from about 0.001% to about 0.35%, based on the weight of the polyol component. If amounts of water less than 0.001% are removed, there is no measurable effect on the process. If amounts of water greater than 0.35% are added, competing gas-forming reactions may occur, and these reactions tend to produce undesirable foaming of the polyurethane elastomers. Accordingly, this invention is intended to produce a polyurethane elastomer and not a polyurethane foam.

The polyol component may contain either a single polyol or a mixture of two or more polyols. The specific polyols useful in the manufacture of polyurethane elastomers are well-known in the art and include aliphatic, alicyclic and aromatic polyols. More specifically, the polyol component useful in this invention has an average functionality within the range of 2-8, preferably within the range of 2-3, and an average molecular weight of from about 900 to about 9000, preferably from about 1000 to about 6000. The polyol component may contain isomeric and polymeric polyols. Additionally, the polyol component has a hydroxyl number of less than about 120, preferably less than about 93.5.

The preferred polyols suitable for use in this process are:
ethylene glycol
diethylene glycol
propylene glycol
dipropylene glycol
glycerine
sucrose
butylene glycol
polyether polyols derived from ethylene oxide, propylene oxide, and mixtures of such oxides
polyether polyols derived from propylene oxide and capped with ethylene oxide
polyethylene glycol
polypropylene glycol
polybutylene glycol
1,2-polydimethylene glycol
polydecamethylene glycol
mixtures of the above polyols The isocyanate component may contain either a single isocyanate or a mixture of two or more isocyanates. The specific isocyanates useful in the manufacture of polyurethane elastomers are well-known in the art and include aliphatic, alicyclic and aromatic isocyanates. Preferred isocyanates have an average functionality within the range of 2-8, preferably within the range of 2-5. Examples of preferred isocyanates are:
2,4-toluene diisocyanate
2,6-toluene diisocyanate
1,6-hexamethylene diisocyanate
naphthalene-1,4-diisocyanate
diphenyl methane 4,4'-diisocyanate
4,4'-diphenylene diisocyanate
3,3'-dimethoxy biphenylene diisocyanate
polymeric forms of the above diisocyanates
mixtures of the above diisocyanates As stated above, the improved process of this invention includes a bismuth catalyst. Various bismuth catalysts are useful in the manufacture of polyurethane elastomers, but the preferred catalysts for this invention are bismuth neodecanoate and bismuth octoate. The catalyst may also be a mixture of two or more bismuth catalysts.

Additionally, the bismuth catalyst may contain other co-catalysts to accommodate different parameters of the process or requirements of the polyurethane elastomer product. For example, certain amine-based and zinc-based catalysts can be used. A specific example of a useful co-catalyst is zinc neodecanoate.

Optionally, a filler may be added to the reaction mixture of this process. Fillers are used in the manufacture of polyurethane elastomers to fill the elastomer and thereby achieve certain physical changes. For example, fillers are used to increase the density and, therefore, the weight of the polyurethane elastomer. The increased weight is desirable for the polyurethane elastomer to be more effective, such as in use as a backing material for carpet tile, as the increased weight serves to better hold the tile in place on the floor.

Examples of suitable fillers are alumina trihydrate, gypsum, talc, calcium carbonate, antimony trioxide, bentonite, kaolin, baryte, barium sulfate and mixtures of such materials.

Other materials can be added to the reaction mixture to achieve desired results. Examples of such materials are surfactants, colorants, pigments and antioxidants.

Processes for the manufacture of polyurethane elastomers are well-known in the art and, therefore, need not be detailed in this application.

For purposes of this application, the following definitions shall apply:

A. The term "rate of reaction" refers to the time (in minutes) required for the polyurethane elastomer to attain a viscosity of 20,000 centipoises. The viscosity-measuring instrument is a Brookfield viscometer-Model RVF having a No. 5 spindle and operated at 20 rpm. The test is conducted on a 200 g. sample of the elastomer.

B. The term "curing time" refers to the time (in seconds) required for a 200 g. sample of the elastomer to harden when poured from the reaction vessel onto a surface heated to 140° C.

The essential feature of this improved process relates to the addition or removal of water in order to adjust the catalytic activity and the rate of reaction. Preferably, the addition or removal of water is accomplished by adding water to, or removing water from, the polyol component of the reaction mixture.

In the manufacture of polyurethane elastomers, the activity of the bismuth catalyst begins quickly, and the catalytic effect is strong, which produces a rapid rate of reaction. In the improved process of this invention, the addition of water delays the initiation of catalytic activity and, consequently, slows the rate of reaction. We have found that the initiation of catalytic activity can be delayed and the rate of reaction can be slowed by the addition of water to the reaction mixture, preferably to the polyol component. We have also found that the rate of reaction is increased by the removal of water from the reaction mixture, preferably from the polyol component.

In accordance with this invention, the addition of water to this process may be accomplished by various means. For example, the water may be added directly to the reaction mixture. Preferably, the water is added to the polyol component of the reaction mixture. In an alternative method, water may be added to the reaction mixture as an ingredient of the filler.

The removal of water to accelerate the catalytic activity and rate of reaction may also be accomplished by various methods. For example, water may be removed by evaporation, such as by heating the reaction mixture under vacuum and then collecting and removing the evaporated water. Preferably, water is removed from the polyol component of the reaction mixture by the use of molecular sieves, which are water scavengers well-known in chemical processes.

Especially effective molecular sieves are sold by UOP.

The present invention is further illustrated by the following examples which are illustrative of certain embodiments designed to teach those of ordinary skill in this art how to practice this invention and to represent the best mode contemplated for carrying out this invention.

EXAMPLES 1-11

The polyurethane elastomers used in Examples 1-11 are made with the following ingredients according to procedures well-known in the industry:

| Ingredient | Parts |
| --- | --- |
| Polyether diol (derived from propylene oxide and capped with ethylene oxide-mol. wt. approx. 2,000; from Dow Chemical Co.) | 75.0 |
| Polyether triol (derived from propylene oxide and capped with ethylene oxide-mol. wt. approx. 5,000; from Dow Chemical Co.) | 11.0 |
| Diethylene glycol | 6.0 |
| Sucrose-based polyol sold as Voranol 9446 by Dow Chemical Co. | 6.0 |
| 1,4-Butanediol | 2.0 |
| Bismuth neodecanoate/zinc neodecanoate | 0.04 |
| Inorganic filler | variable (see Table) |
| Molecular sieve sold as No. 3A by UOP) | variable (see Table) |
| Diphenyl methane diisocyanate (polymeric form-sold as Isonate 7700 by Dow Chemical Co.) | amount required for 100 parts |

More specifically, all of the above ingredients, except for the diisocyanate, are first mixed to obtain the B Side (or polyol component) of the reaction mixture. The A Side (or isocyanate component) is then mixed with the B Side for about 30 seconds in a mechanical mixer under process conditions well-known in the industry.

In Examples 1-11, the types and amounts of bismuth catalyst and polyol component are constant. The percent water (or percent moisture) is determined with Karl Fischer reagents and with identical laboratory techniques.

The following Table for Examples 1-11 identifies the fillers, the rate of reaction with and without the removal of water and the curing times with and without the removal of water. In the Table, the filler is alumina trihydrate (ATH), calcium carbonate (WF-75) or mixtures of such compounds.

For purposes of explanation, the Table shows that the polyurethane elastomer of Example 1 is made using 100 parts alumina trihydrate as the filler, with the water content of the polyol and filler components being 0.11 percent. In Example 1, the removal of water by molecular sieves (a) increases the rate of reaction to 3.5 minutes from 8 minutes and (b) increases the curing time to 30 seconds from 50 seconds.

In Example 8, the reaction time is 3.5 minutes when water is removed, thereby showing an increased reactivity compared to a reaction time of 7.5 minutes without the removal of water.

One the other hand, Example 9 is a duplicate of Example 8 except that 0.1% water is added to the reaction mixture. The reaction time is 10 minutes in Example 9 but, with the removal of water by molecular sieves, the reaction time is 3.5 minutes (reflecting an increased rate of reaction).

When used in Examples 1-11, the molecular sieves are added to the polyol component.

| Example | Filler (parts per 100 parts polyol component) | % Water in Reaction Mixture | Rate of Reaction (w/o molecular sieves) | Rate of Reaction (w/3 parts by weight molecular sieves in polyol component) | Curing Time (w/o molecular sieves) | Curing Time (w/3 parts by weight molecular sieves in polyol component) |
| --- | --- | --- | --- | --- | --- | --- |
| 1 | 100 ATH | 0.11 | 8 | 3.5 | 50 | 30 |
| 2 | 130 ATH | 0.13 | 10 | 5 | 60 | 30 |
| 3 | 160 ATH | 0.16 | 13 | 6 | 60 | 35 |
| 4 | 100 WF-75 | 0.10 | 8.5 | 3 | 40 | 30 |
| 5 | 130 WF-75 | 0.10 | 13.5 | 3 | 60 | 30 |
| 6 | 160 WF-75 | 0.10 | 19.5 | 3.5 | >90 | 40 |
| 7 | 180 WF-75 | 0.10 | 21 | 5 | >90 | 40 |
| 8 | 100 ATH + 60 WF-75 | 0.09 | 7.5 | 3.5 | — | — |
| 9 | 100 ATH + 60 WF-75 + 0.1 Water | 0.13 | 10 | 3.5 | — | — |
| 10 | 100 ATH + 60 WF-75 | 0.09 | — | 3.5 | — | — |
| 11 | 100 ATH + 60 WF-75 + 0.7 Water | 0.27 | — | 6 | — | — |

The data in the Table clearly shows that the rate of reaction slows with increased water content and accelerates when water is removed from the reaction mixture with molecular sieves.

The polyurethane elastomers produced by the improved process of this invention can be effectively used as backing materials for commercial carpet tiles, in molded products, etc.

In practice, the various ingredients (isocyanate, polyol, bismuth catalyst, water, etc.) are used to manufacture a polyurethane elastomer. If the rate of reaction is not as desired, this invention provides a process by which the water content of the reaction mixture can be increased to slow the rate of reaction or decreased to accelerate the rate of reaction. In accordance with this invention, the total water content of the reaction mixture is of concern, without regard to the source(s) of such water.

While this invention has been described in detail with particular reference to certain embodiments, variations and modifications can be made without departing from the spirit and scope of the invention as described above and as defined in the following claims.

What is claimed is:

1. An improved process for the manufacture of a polyurethane elastomer by the reaction of a mixture of a polyol component and an isocyanate component, in which the polyol component contains water and a bismuth catalyst, wherein the improvement comprises slowing the rate of reaction by the addition of water to the reaction mixture or accelerating the rate of reaction by the removal of water from the reaction mixture.

2. A process as defined by claim 1, wherein the polyol component has an average functionality of from about 2 to about 8.

3. A process as defined by claim 1, wherein the polyol component has an average molecular weight of about 900 to about 9000 and a hydroxyl number of less than about 120.

4. A process as defined by claim 1, wherein the polyol component is polyethylene glycol, polypropylene glycol, polybutylene glycol, 1,2-polydimethylene glycol, polydecamethylene glycol, ethylene glycol, diethylene glycol, propylene glycol, dipropylene glycol, glycerine, sucrose, or mixtures thereof.

5. A process as defined by claim 1, wherein the polyol component is a polyether derived from ethylene oxide, propylene oxide and mixtures of such oxides or a polyether derived from propylene oxide and capped with ethylene oxide.

6. A process as defined by claim 1, wherein the polyol component is a polyether derived from ethylene oxide, propylene oxide and mixtures of such oxides, a polyether derived from propylene oxide and capped with ethylene oxide, ethylene glycol, diethylene glycol, propylene glycol, dipropylene glycol, glycerine, sucrose, or mixtures thereof.

7. A process as defined by claim 1, wherein the isocyanate component has an average functionality from 2–5 and is a diisocyanate or mixture of isocyanates.

8. A process as defined by claim 1, wherein the isocyanate component is an aromatic diisocyanate.

9. A process as defined by claim 1, wherein the isocyanate component is 2,4-toluene diisocyanate, 2,6-toluene diisocyanate, 1,6-hexamethylene diisocyanate methane diisocyanate, naphthalene 1,4-diisocyanate, diphenyl methane-4,4'-diisocyanate, 3,3'-dimethoxy biphenylene diisocyanate, 4,4-diphenylene diisocyanate, polymeric forms of such diisocyanates or mixtures thereof.

10. A process as defined by claim 1, wherein the reaction mixture contains an inorganic filler.

11. A process as defined by claim 10, wherein the inorganic filler is calcium carbonate, alumina trihydrate, antimony trioxide, talc, bentonite, kaolin, baryte or mixtures thereof.

12. A process as defined by claim 1, wherein the bismuth catalyst is bismuth neodecanoate.

13. A process as defined by claim 1, wherein the bismuth catalyst is bismuth octoate.

14. A process as defined by claim 1, wherein the bismuth catalyst is a mixture of bismuth neodecanoate and zinc neodecanoate.

15. A process as defined by claim 1, wherein the rate of reaction is decreased by the addition of water in the amount of about 0.001 to about 0.35 percent, by weight, based on the weight of the polyol component.

16. A process as defined by claim 1, wherein the rate of reaction is increased by the removal of water from the polyol component.

17. A process as defined by claim 1, wherein the added water is contained in the inorganic filler.

18. A process as defined by claim 1, wherein the water is removed by molecular sieves.

19. A process as defined by claim 1, wherein the water is removed by heating the reaction mixture under vacuum and removing the evaporated water.

* * * * *